No. 671,222. Patented Apr. 2, 1901.
J. J. MOULE.
TRUCK.
(Application filed Aug. 7, 1900.)
(No Model.) 2 Sheets—Sheet 1.
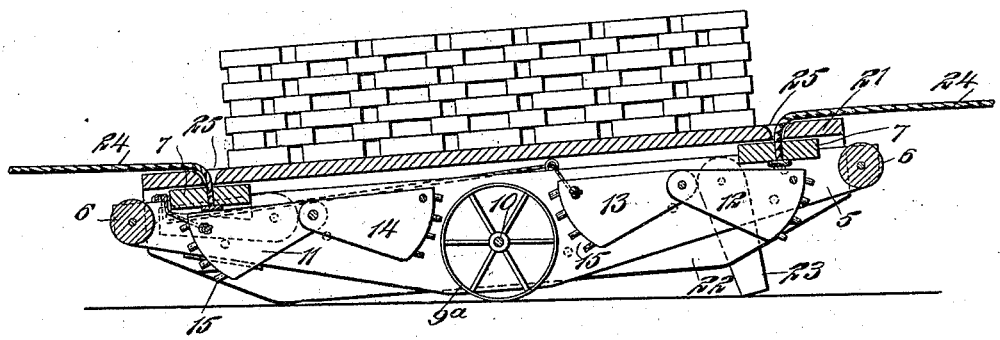
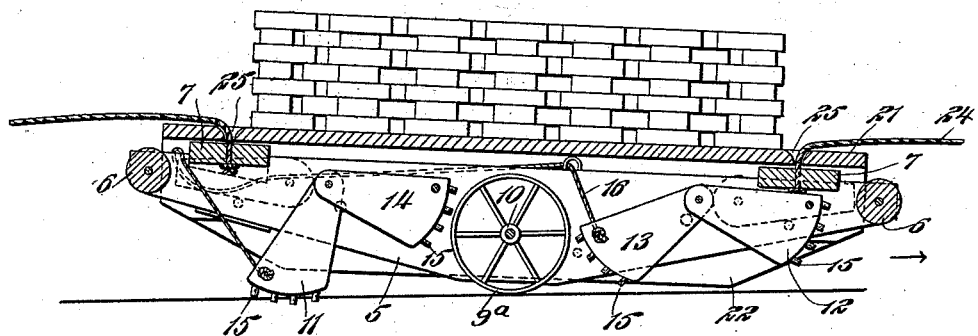
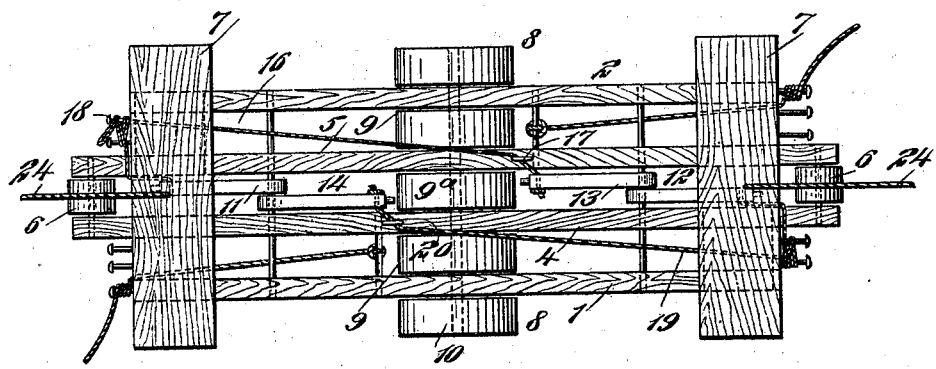
WITNESSES: INVENTOR
John J. Moule.
BY
ATTORNEYS No. 671,222. Patented Apr. 2, 1901.
J. J. MOULE.
TRUCK.
(Application filed Aug. 7, 1900.)
(No Model.) 2 Sheets—Sheet 2.
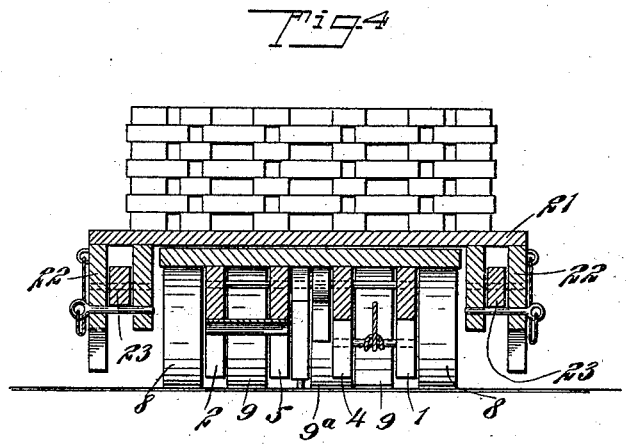
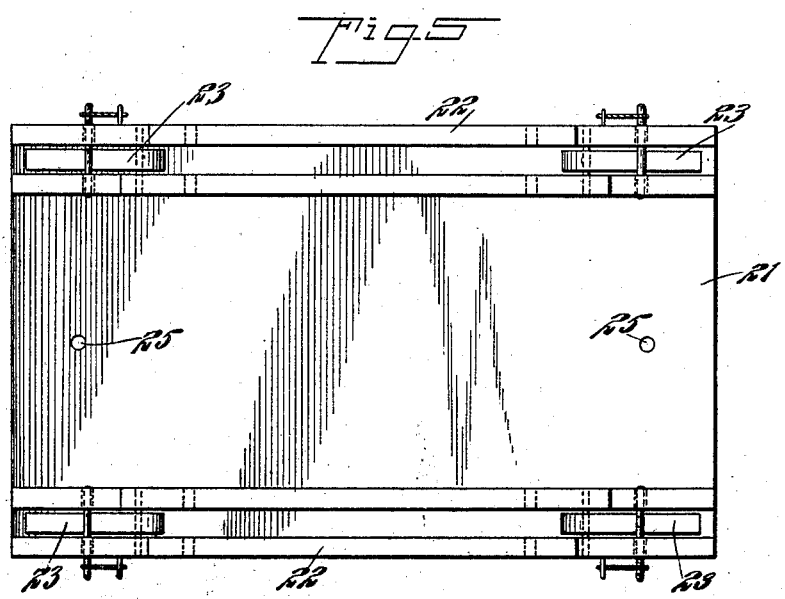
WITNESSES:
INVENTOR
John J. Moule.
BY
ATTORNEYS

UNITED STATES PATENT OFFICE.

JOHN JAMES MOULE, OF STOCKTON, CALIFORNIA.

TRUCK.

SPECIFICATION forming part of Letters Patent No. 671,222, dated April 2, 1901.

Application filed August 7, 1900. Serial No. 26,170. (No model.)

*To all whom it may concern:*

Be it known that I, JOHN JAMES MOULE, a citizen of the United States, and a resident of Stockton, in the county of San Joaquin and State of California, have invented a new and Improved Truck, of which the following is a full, clear, and exact description.

This invention relates to improvements in trucks especially adapted for moving bricks or similar heavy materials from place to place; and the object is to provide a truck by means of which a very heavy load may be moved by comparatively little manual exertion.

I will describe a truck embodying my invention and then point out the novel features in the appended claims.

Reference is to be had to the accompanying drawings, forming a part of this specification, in which similar characters of reference indicate corresponding parts in all the figures.

Figure 1 is a sectional elevation showing a truck and its load-supporting platform in the position preparatory to moving the truck. Fig. 2 is a similar section, but showing a position assumed by the truck while moving. Fig. 3 is a plan view of the truck. Fig. 4 is a cross-section, and Fig. 5 is a plan view, of the platform.

The truck comprises a frame consisting of longitudinal side members 1 2 and two intermediate longitudinal members 4 and 5, between the extended ends of which are rollers 6, the several longitudinal members being connected at the ends by cross-bars 7. At its center the truck is supported by a series of rollers consisting of outer rollers 8 and rollers 9, which are placed between the outer members and the next adjacent inner members of the frame, and a central roller $9^a$, the several rollers being placed on a shaft 10. The truck while being moved in either direction, as will be hereinafter described, is designed to have a rocking motion. Therefore the under sides of the longitudinal members of the frame are curved in both directions from the center outward and upward, making them substantially in the form of rockers.

For assisting in moving the truck I employ propelling devices in the form of legs pivoted at the opposite ends of the frame. A propelling device 11 at one end of the frame coacts with a similar propelling device 12 at the opposite end of the frame. Another pair of propelling devices 13 and 14 has pivotal connection within the frame similarly to the propellers before described. The lower or free end of one pair of propellers is curved in an opposite direction to that of the other pair, as it is to be understood that one pair of propellers is to be employed while moving the truck in one direction and the other pair is to be employed when moving the truck in the opposite direction. Each propeller is provided on its free end with pins or projections 15, designed to enter the ground, and of course while one pair of propelling devices is in use the other pair must be held upward out of possible engagement with the ground. For this purpose I employ a rope 16, which connects at its respective ends with the propellers 11 and 13, passing through an eye 17 on the frame and adapted to engage pins 18 at one end of the frame. A similar rope 19 connects the propellers 12 and 14, passing through an eye 20 on the frame. When a pair of propellers is to be drawn upward, this may be done by pulling upon the rope connecting therewith, after which the rope may be coiled or otherwise secured to the pins or the like on the side members of the frame or to any other convenient point.

It may be here stated that I employ five or more wheels for the truck, so as to prevent the wheels from sinking into soft ground, as is very often found in brick-yards or the like.

A load-platform 21 is designed to be carried by the truck, and to the side members 22 of this platform legs 23 are pivoted, the legs being sufficiently long when in their lowered position to raise the under side of the platform above the top of the truck-frame, so that the truck may be readily moved underneath the platform or removed therefrom.

In operation after placing a load of bricks or other material on the load-platform, which, as before described, is to be supported by its legs 23, the truck is to be moved underneath the same and draw-ropes 24 are to be passed through openings 25 in the ends of the platform. After this by swinging the legs 23 upward, as indicated in dotted lines in Fig. 1, the platform will be caused to rest upon the truck. When the truck and drying-platform are in the position indicated in the drawings, all that is required to do to take out the truck is to hook a horse to the drawing-rope 24 and the truck comes out. The table remains for several days while the bricks are drying. I then run the truck under the table, pass rope 24 through a hole 25, hook on the horse, and he pulls the entire thing together. The table-legs take care of themselves. As the table and truck move together the legs draw back and the truck receives the load. Now, assuming that the truck is to be moved in the direction indicated by the arrow in Fig. 2, the propelling devices 11 and 13 are to be released, so that their free ends will come in engagement with the ground. Upon rocking the forward end of the truck-frame downward the propelling device 13 by engaging with the ground and while the horse is drawing on the rope of the truck will act to aid the truck in its upward and onward movement. While this forward end is being rocked upward the rear end of course will be moved downward, so that its propelling device 11 may move into operative engagement with the ground. This rocking and drawing operation is to be continued until the destination of the truck shall have been reached.

By this device it is evident that very heavy loads may be moved with comparative ease, and the propellers, acting as levers, serve materially in forcing the device along.

Having thus described my invention, I claim as new and desire to secure by Letters Patent—

1. A truck, comprising a frame, wheels upon which the frame is mounted, said wheels being at the longitudinal center of the truck-frame, and swinging propelling devices at opposite ends of the truck-frame, substantially as specified.

2. A truck, comprising a frame, a plurality of wheels upon which the frame is mounted, the said wheels being located at the longitudinal center of the frame, two pairs of propelling devices mounted to swing on the frame, the propellers of a pair being located near opposite ends of the frame, and means for holding the propellers in a position out of engagement with the ground, substantially as specified.

3. A truck, comprising a frame, wheels on which said frame is mounted and upon the shaft of which the frame has a rocking motion, swinging propelling devices near opposite ends of the frame, a load-platform, and legs for said platform by means of which it may be supported above the truck, substantially as specified.

4. A truck-frame, comprising a series of longitudinal members, cross-bars connecting the ends of the longitudinal members, the several members being curved outward and upward from the center toward the ends, wheels located at the longitudinal center of the frame, two pairs of propelling devices in the form of levers pivoted to the frame at opposite sides of the wheels, the said propelling devices being curved on their free ends, the curve of one pair being in an opposite direction to the curve of the other pair, pins or projections on said free ends, and means for supporting one pair of propelling devices in an elevated position while the other pair is in use, substantially as specified.

In testimony whereof I have signed my name to this specification in the presence of two subscribing witnesses.

JOHN JAMES MOULE.

Witnesses:
I. L. KOPPEL,
C. K. FLEMING.